E. MULLER.
Manufacture of Cream of Tartar.
No. 222,598. Patented Dec. 16, 1879.
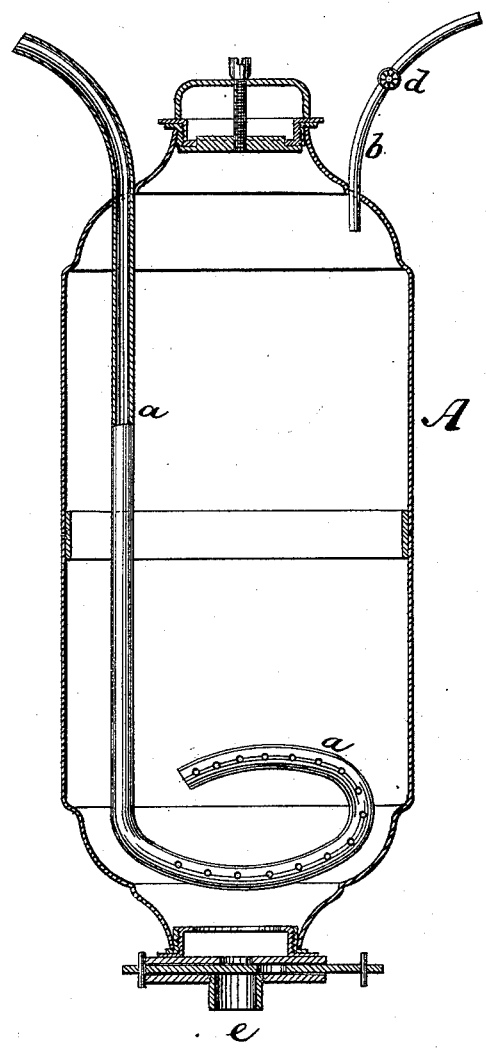

UNITED STATES PATENT OFFICE.

EDWARD MULLER, OF NEW YORK, N. Y.

IMPROVEMENT IN THE MANUFACTURE OF CREAM OF TARTAR.

Specification forming part of Letters Patent No. 222,598, dated December 16, 1879; application filed September 11, 1879.

*To all whom it may concern:*

Be it known that I, EDWARD MULLER, of New York city, county and State of New York, have invented an Improved Process of Treating Argols in the Manufacture of Cream of Tartar, of which the following is a specification.

The accompanying drawing represents a sectional elevation of the apparatus used for carrying my improved process into effect.

This invention relates to a new process of obtaining chemically-pure cream of tartar from argols, and for completely separating therefrom the tartrate of lime and other matter contained in the argols.

Usually cream of tartar is separated and obtained for the market by treating the argols with certain chemicals, as is, for example, described in Letters Patent No. 217,235. The argols have also been treated with steam in a closed vessel in the presence of chemicals, as is described in Letters Patent No. 183,597.

My invention seeks to dispense with the use of all chemicals in the obtaining of cream of tartar from argols; and it consists in treating the argols, in the presence of water, with steam under pressure within a vessel, from which the steam is permitted to escape during the operation of the process.

My process is as follows: A vessel, A, having a capacity of, say, four thousand gallons, more or less, is filled about half-full with water, and about six thousand pounds of argols are then put into the water. Steam, under a pressure of about sixty pounds, more or less, is then let into the vessel A through a pipe, $a$, which preferably leads into the lower part of the vessel, and is there pierced with fine holes, so that the steam will enter and permeate the water in diminutive jets.

A steam-escape pipe, $b$, connects with the upper part of the vessel A, and is opened to the requisite extent by means of a suitable valve or cock, $d$, so that the steam is free to escape from the vessel, but not as fast as it is admitted thereto.

By thus admitting the steam into the water containing the argols violent boiling is effected, which, taking place under pressure, serves to rapidly dissolve the bitartrate of potassa contained in the argols. The pressure should be gradually augmented by gradually reducing the escape-opening in the pipe $b$, and after the boiling has thus taken place for about one hour the escape-pipe $b$ may be entirely closed, or nearly so.

Within a space of about three hours from the commencement the cream of tartar will be completely dissolved in the water, the tartrate of lime and other impurities falling to the bottom.

The proportions above given may, of course, be varied, in which case the extent of time above mentioned is also proportionately changed.

After the steam has affected the water and the argols in manner stated, its further supply is shut off, and the vessel, with its contents, left undisturbed for about two days, to allow the dissolved cream of tartar to crystallize on the inner walls of the vessel. At the end of this period the water, with the sediment impurities, is discharged from the vessel through a lower outlet, $e$, and then the crystals of cream of tartar are removed.

The theory of my new process is as follows: By boiling the argols in water in manner stated—that is to say, with the aid of steam let into the water—a temperature of about 250° Fahrenheit is obtained. At this temperature the cream of tartar is positively dissolved, the proportion of about one gallon of water to three pounds of argols being sufficient for the purpose. The violent commotion caused by the introduction of steam assists the process materially, both as to thoroughness of separation and rapidity of action. The tartrate of lime contained in the argols would require, in order to permit its solution, about two thousand parts of water (by weight) to one part of tartrate of lime; and as the proportion of water used in my process is far less, the tartrate of lime is not dissolved, but is precipitated, together with the other impurities.

Thus it will be seen that my process is economical and productive of very satisfactory results in yielding the pure cream of tartar.

I claim—

The process of manufacturing cream of tartar from argols, which consists in exposing the argols, in the presence of water alone, in about the proportions specified, to the action of steam under pressure of about sixty pounds to the inch, the steam being injected into the water, causing it to boil, and permitted to escape from the converting-vessel, and finally separating the cream of tartar by crystallization, substantially as specified.

EDWARD MULLER.

Witnesses:
T. B. MOSHER,
W. G. E. SCHULTZ.